United States Patent
Rahman (10) Patent No.: US 11,844,126 B2
(45) Date of Patent: *Dec. 12, 2023

(54) CARRIER AGGREGATION CONTROL SYSTEMS AND METHODS

(71) Applicant: T-Mobile USA, Inc., Bellevue, WA (US)

(72) Inventor: Muhammad Tawhidur Rahman, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 168 days.

This patent is subject to a terminal disclaimer.

(21) Appl. No.: 17/395,362

(22) Filed: Aug. 5, 2021

(65) Prior Publication Data

US 2021/0368570 A1 Nov. 25, 2021

Related U.S. Application Data

(63) Continuation of application No. 16/597,754, filed on Oct. 9, 2019, now Pat. No. 11,096,228.

(51) Int. Cl.
| | |
|---|---|
| *H04W 76/15* | (2018.01) |
| *H04W 72/08* | (2009.01) |
| *H04W 8/02* | (2009.01) |
| *H04W 72/542* | (2023.01) |
| *H04W 72/0453* | (2023.01) |
| *H04W 88/16* | (2009.01) |
| *H04W 88/06* | (2009.01) |

(52) U.S. Cl.
CPC ............ *H04W 76/15* (2018.02); *H04W 8/02* (2013.01); *H04W 72/542* (2023.01); *H04W 72/0453* (2013.01); *H04W 88/06* (2013.01); *H04W 88/16* (2013.01)

(58) Field of Classification Search
CPC ...... H04L 5/0098; H04L 5/001; H04W 76/15; H04W 24/08; H04W 72/542; H04W 24/02; H04W 8/02; H04W 72/0453; H04W 88/16
See application file for complete search history.

(56) References Cited

U.S. PATENT DOCUMENTS

| | | | |
|---|---|---|---|
| 9,820,289 B1 | 11/2017 | Pawar et al. | |
| 11,096,228 B2* | 8/2021 | Rahman | H04W 24/02 |
| 2015/0358969 A1 | 12/2015 | Choi et al. | |
| 2017/0086209 A1 | 3/2017 | Panchal et al. | |
| 2018/0084565 A1 | 3/2018 | Pang et al. | |
| 2018/0176966 A1 | 6/2018 | Cui et al. | |
| 2019/0280845 A1* | 9/2019 | Bedekar | H04W 24/10 |

* cited by examiner

*Primary Examiner* — Maharishi V Khirodhar
*Assistant Examiner* — Kenneth P Hunt
(74) *Attorney, Agent, or Firm* — Perkins Coie LLP (57) ABSTRACT

Systems and methods for controlling carrier aggregation (CA) are disclosed. The method includes determining a communication characteristic describing data communicated between user equipment (UE) and a communication endpoint. The communication characteristic is used to generate a CA trigger that controls at a communication node a number or assignment of component carriers used to simultaneously communicate the data to/from the UE.

20 Claims, 5 Drawing Sheets

CARRIER AGGREGATION CONTROL SYSTEMS AND METHODS

CROSS-REFERENCE TO RELATED APPLICATION

This application is a continuation of U.S. patent application Ser. No. 16/597,754, filed Oct. 9, 2019, entitled CARRIER AGGREGATION CONTROL SYSTEMS AND METHODS, which is hereby incorporated by reference in its entirety.

BACKGROUND

Rapid growth in computing technology is creating greater demand for data communication. Some mobile devices and applications allow users to watch streaming content in ultra-high definition. Also, an increasing number of new devices (e.g., Internet of Things (IoT) devices, and/or wearable devices) or devices that previously provided limited functionalities (e.g., appliances) are now communicating data. With such growth in technology, consumers' desire to instantly access improved quality content regardless of location will continue to drive the demand for faster instantaneous data transfer (e.g., greater bandwidth). However, other existing or new applications/features will require relatively slower or limited data transfer, such as for downloading simple websites and/or for short message service (SMS).

In the drawings, some components and/or operations can be separated into different blocks or combined into a single block for discussion of some of the implementations of the technology introduced here. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

To account for different data communication patterns/needs, wireless communication standards (e.g., Third Generation Partnership Project (3GPP) standards) allow for carrier aggregation (CA). For example, in Long Term Evolution Advanced (LTE-A) communication systems, carrier aggregation allows for data (e.g., content) to be communicated over multiple component carriers (e.g., communication slots, such as frequencies/bandwidths and/or time periods) to one receiver (e.g., a computing device or User Equipment (UE)). The data can be split and simultaneously communicated over the multiple component carriers, and the data can be combined/stitched together at the receiver to recreate or regenerate the original content.

In conventional communication systems/networks, carrier aggregation is controlled by a connection node (e.g., an access point (AP) or a base station, such as an Evolved Node B (eNodeB) and/or a gigabit Node B (gNodeB or gNB)). However, the connection node is tasked with implementing/managing the radio or wireless connection between devices and has no insight into the data being communicated between the devices. As such, conventional connection nodes control or implement carrier aggregation based on instantaneous metrics for data communications that are often limited and misleading.

In contrast, embodiments disclosed herein determine various aspects of the data communications beyond the instantaneous metrics and control the carrier aggregations accordingly. For example, one or more components or nodes (e.g., packet data network gateways (PGWs) and/or serving gateway (SGWs)) in a core network or a data routing network can determine a communication end-point for the communicated data, such as based on analyzing data source/destination and/or routing information. The one or more components can determine or estimate a content type based on observing the data communication pattern (e.g., instantaneous bit rate over a predetermined duration). According to the determined aspects of the data communications, the core network can generate and communicate a carrier aggregation trigger to the connection node to control the carrier aggregation. The core network can implement the carrier aggregation based on the carrier aggregation trigger, such as by controlling a number of component carriers and/or by assigning specific frequency slots for communicating to the corresponding device.

As an illustrative example, high/ultra-definition streaming applications that continuously require large bandwidth for instantaneously communicating large amounts of data will likely benefit from carrier aggregation. In contrast, carrier aggregation may not be applicable for initial downloads or protocol-based exchanges for such services since exchanged data often require less bandwidth and/or shorter durations (e.g., less than 1 to 10 seconds in comparison to minutes/hours for streaming). Further, carrier aggregation may not be applicable for other applications that are configured to communicate shorter bursts of data and/or lesser amounts of data, such as for SMS applications.

Since communicating parties (e.g., service or content providers and/or their corresponding servers) are configured to communicate a limited number of content types, the core network can use the data source/destination (e.g., server name or address) to estimate the user application providing or consuming the communicated data. In other words, the core network can predict the required bandwidth and/or the duration for the communication based on identifying the server communicating with the UE. Also, the core network can compare bit rates over time to template patterns to predict required bandwidth and/or the duration for subsequent/continuing communication. The core network can use the predictions to generate the carrier aggregation trigger, thereby controlling the carrier aggregation implemented at the connection node. For example, the core network can implement carrier aggregation and/or assign a greater number of component carriers for high-bandwidth applications, such as speed tests, ultra/high-definition video communications, real time or live content communications, etc. Also, the core network can implement carrier aggregation with a lesser number of component carriers for other applications that implement buffered content output/display, non-real time (e.g., recorded) content communications, etc. Further, the core network can prohibit or remove carrier aggregation for applications or communications that require bandwidths under one or more predetermined thresholds and/or communicate for less than a threshold duration, such as for initial downloads, protocol-based communications, webpage access/downloads, SMS communications, etc.

In the following description, for the purposes of explanation, numerous specific details are set forth in order to provide a thorough understanding of implementations of the technology introduced here. It will be apparent, however, to one skilled in the art that implementations of the introduced technology can be practiced without some of these specific details.

The techniques introduced here can be implemented as special-purpose hardware (for example, circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the technology introduced here and can be included in more than one implementation. In addition, such phrases do not necessarily refer to the same implementations or different implementations.

Figure 1:
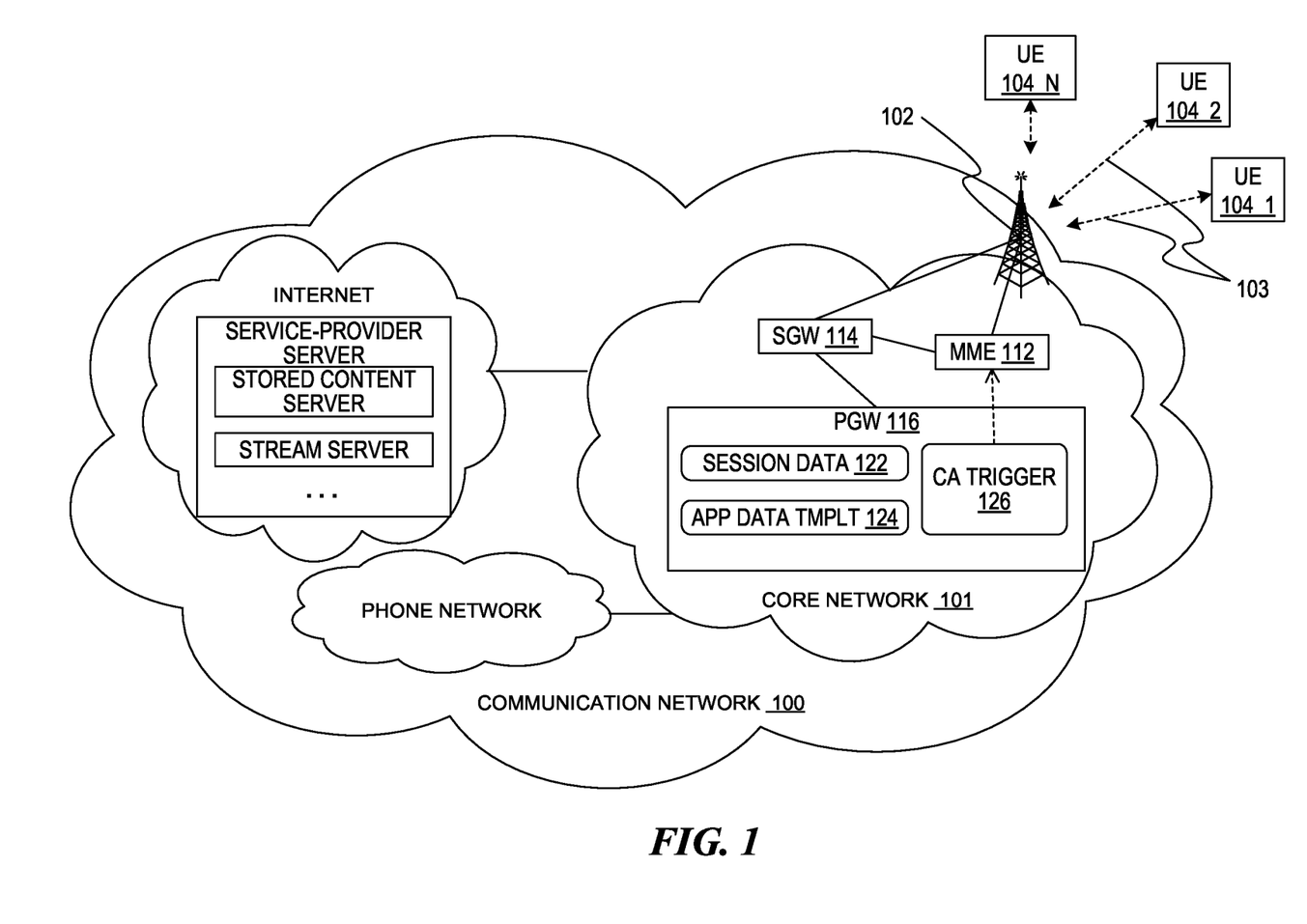
FIG. 1 illustrates a communication network in which some implementations of the introduced technology can be utilized.

FIG. 1 illustrates a communication network 100 (also referred to herein as network 100) in accordance with various implementations or embodiments. The network 100 can include a core network 101 configured to function as a backbone portion of the network 100. For example, the core network 101 can include components configured to implement wireless communications, such as cellular communication networks and/or wireless fidelity networks. The core network 101 can be connected to different parts of the network 100, such as the Internet and/or telephone networks. Accordingly, the core network 101 can establish/facilitate communication sessions 103 for exchanging data between communication endpoints (e.g., end-user devices and/or service provider servers).

The core network 101 can include a connection node 102 (e.g., a base station (BS)) communicatively coupled to one or more user equipment (UE), such as UEs 104_1-104_N. The connection node 102 can serve UEs 104 located within a geographical area, for example, within a macro cell. The connection node 102 can be configured to connect the served UEs 104 to a larger network (e.g., the Internet, the telephone network, etc.), such as for communicating voice traffic and/or data traffic to and/or from the connected UEs 104. The connection node 102 can include a RAN Node such as an Evolved-Universal Terrestrial Radio Access Network (E-UTRAN) Node B (also commonly denoted an eNode B, or eNB) and/or RNC in an E-UTRAN. The connection node 102 can include a next generation Node B (gNB). The connection node 102 can communicate with the UEs 104 using one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communication networks.

In general, the network 100 can include multiple cells, with each cell including one or more BSs (macro cell), 5G transceivers (including small cell devices), or a combination of both macro and small cells (HetNets), though many other cell types are possible including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc.

The connection node 102 can be communicatively coupled (for example, using a backhaul connection) to backhaul equipment, for example, an operation support subsystem (OSS) server, a radio network controller (RNC), etc. The RNC can also be in the form of or include a mobility management entity (MME) 112. The MME 112 can be a control node for an access network. The MME 112 can control an idle mode UE paging and tagging. The MME 112 can select a serving gateway (SGW) 114 for the UEs. The SGW 114 can be a component configured to route and forward user data packets to/from the UEs (e.g., via the connection node 102). The SGW 114 can function as a reference for a user plane during handovers for connecting UE to a different connection node.

The core network 101 can further include one or more package data network (PDN) gateways (PGWs) 116 operably coupled to the SGW 114. The PGWs 116 can include network components configured to provide connectivity between the UEs and external packet data networks. In other words, the PGWs 116 can function as an exit/entry point of traffic for the UEs. The PGWs 116 can implement policy enforcement, packet filtering, charging support, and/or packet screening for the network 100. Accordingly, the PGW 116 can communicate session data 122, such as content data (e.g., voice/sound, text, and/or image data) communicated between the UEs and devices (e.g., other UEs and/or service-provider servers) serving as end-points for the communication sessions 103.

The core network 101 (at, e.g., the PGW 116) can analyze the session data 122 and control CA settings for data exchange between the connection node 102 and the UEs 104. For example, the PGW 116 and/or another component within the core network 101 can determine the communication end-point for the session data 122, such as based on analyzing source/destination address and/or routing information. The core network 101 can compare the analyzing source/destination address and/or the routing information to predetermined information (e.g., lookup tables) that identify communication end-points that communicate high-bandwidth data (i.e., service providers that are more/less likely to benefit from CA). In other words, the core network 101 can analyze the source/destination address and/or the routing information to determine whether the session data 122 is associated with applications that are more/less likely to benefit from CA.

The core network 101 can compare the session data 122 to one or more communication templates 124 that represent communicated data and/or communication patterns over time for one or more applications/features. The communication templates 124 can map or categorize the communicated data and/or communication patterns according to CA details. For example, the communication templates 124 can correspond or assign maximum CA channel quantities/settings for data values/patterns characteristic of speed tests and/or real-time video/audio feeds. Also, the communication templates 124 can correspond or assign no CA settings for data values/patterns characteristic of website downloads and/or other initial setting downloads. The communication templates 124 can correspond or assign predetermined numbers of channels for data values/patterns characteristic of buffered/stored video/audio replay applications and/or other applications that consume intermediate bandwidth levels.

The core network 101 (e.g., the PGW 116) can control the connection node 102 to implement the CA according to the analysis. The PGW 116 can generate a CA trigger 126 that commands or provides CA settings for the corresponding communication session 103. The PGW 116 can communicate the CA trigger 126 to the connection node 102 through the SGW 114 and/or the MME 112. The connection node 102 can implement the CA according to the CA trigger 126. For example, the CA trigger 126 can specify or command a number of channels and/or CA channel assignments for the corresponding communication session 103.

Figure 2:
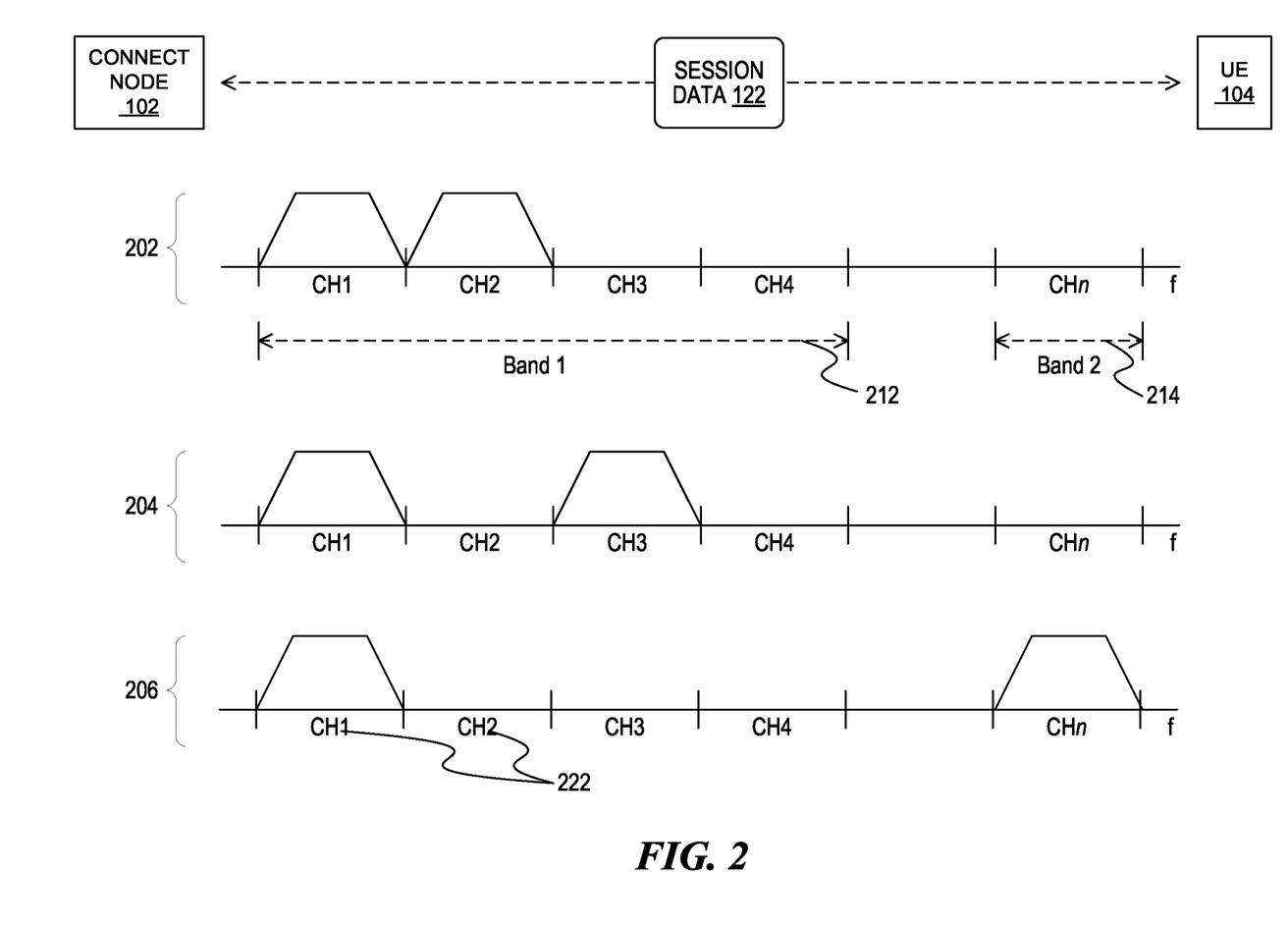
FIG. 2 illustrates carrier aggregation mechanisms in accordance with one or more embodiments of the technology introduced here.

FIG. 2 illustrates CA mechanisms in accordance with one or more embodiments of the technology introduced here. The connection node 102 and the UE 104 can communicate/exchange the session data 122 as described above. In communicating the session data 122, the communication network 100 of FIG. 1 can utilize one or more carrier bands (e.g., a first carrier band 212 and a second carrier band 214) and/or one or more carrier channels 222 therein to communicate the session data 122. For example, the communication network 100 can implement CA and combine/utilize two or more carrier channels 222 in communicating the session data 122 between the connection node 102 and the UE 104 to enhance bandwidth and data capacity.

For CA, the communication network 100 may implement a first CA configuration 202, a second CA configuration 204, and/or a third CA configuration 206. The first CA configuration 202 can correspond to using adjacent instances of the carrier channels 222 (e.g., CH1 and CH2), thereby forming a larger contiguous channel, within the same frequency band to communicate the session data 122. The second CA configuration 204 can correspond to using non-adjacent instances of the carrier channels 222 (e.g., CH1 and CH3) within the same frequency band to communicate the session data 122. The third CA configuration 206 can correspond to using instances of the carrier channels 222 across different frequency bands (e.g., one or more channels from the first carrier band 212 and one or more channels from the second carrier band 214) to communicate the session data 122.

As described above, the core network 101 of FIG. 1 can control the CA using the CA trigger 126 of FIG. 1. For example, the CA trigger 126 can specify one of the CA configurations 202-206 for the communication session 103 of FIG. 1. Also, the CA trigger 126 can specify a number of channels/bands, a specific channel/band assignment, and/or a corresponding category or level (e.g., a priority or a consumption category designation) for the communication session 103. The connection node 102 can implement the CA according to the CA trigger 126 in communicating the session data 122 with the corresponding UE 104.

Figure 3A:
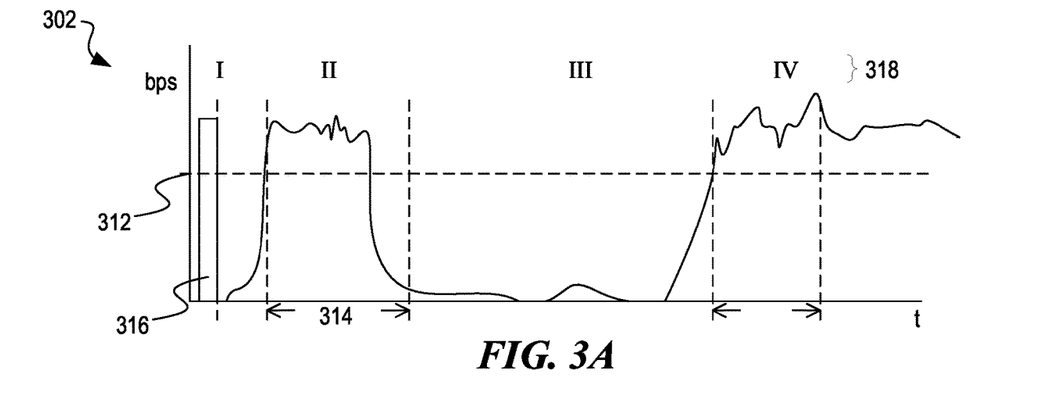
FIG. 3A illustrates an example communication data pattern in accordance with one or more embodiments of the technology introduced here.

FIG. 3A illustrates an example communication data pattern 302 in accordance with one or more embodiments of the technology introduced here. The data pattern 302 can represent metrics for data exchanged between the connection node 102 of FIG. 1 and the UE 104 of FIG. 1 across time. As shown in FIG. 3A, an exchanged amount of data can be represented along a vertical axis (e.g., bits-per second (bps)) and time can be represented along a horizontal axis.

The core network 101 of FIG. 1 can analyze the data pattern 302 and generate/send the CA trigger 126 of FIG. 1 accordingly. For example, the PGW 116 can compare the data pattern 302 to a threshold level 312 and/or a threshold duration 314. When the data pattern 302 exceeds the threshold level 312 for more than the threshold duration 314, the PGW 116 can generate and send the CA trigger 126 to increase the throughput, such as by implementing the CA and/or by increasing the number of channels.

The core network 101 can further analyze the data pattern 302 according to one or more triggering events 316, such as one or more initial hand-shake messages, refresh commands, etc. The core network 101 can use the threshold level 312 and/or the threshold duration 314 to analyze the data pattern 302 following the triggering events 316. The core network 101 may alternatively or additionally analyze the data pattern 302 according to one or more pattern groupings 318 that represent predetermined actions or phases between the UE 104 and the connection node 102. Details regarding the analysis are described below.

The core network 101 can use multiple thresholds. For example, the core network 101 can use the threshold level 312 and/or the threshold duration 314 as a first threshold that corresponds to an initial download of the website or other initial/set up information. Based on satisfaction of the first threshold, the core network 101 can use a second threshold that corresponds to a sustained download of content (e.g., streaming data) to analyze the data pattern 302. Alternatively, or additionally, the core network 101 can adjust (increase or reduce) the threshold level 312 and/or the threshold duration 314 according to analysis results. For example, the core network 101 can reduce the threshold level 312 and/or the threshold duration 314 when the pattern groupings 318 of the data pattern 302 matches one or more predetermined template patterns. In other words, the core network 101 can reduce the threshold level 312 and/or the threshold duration 314 when the pattern groupings 318 of the data pattern 302 correspond to phases/actions that are known to precede an CA-applicable phases or actions (e.g., real-time content downloads, speed tests, etc.).

Figure 3B:
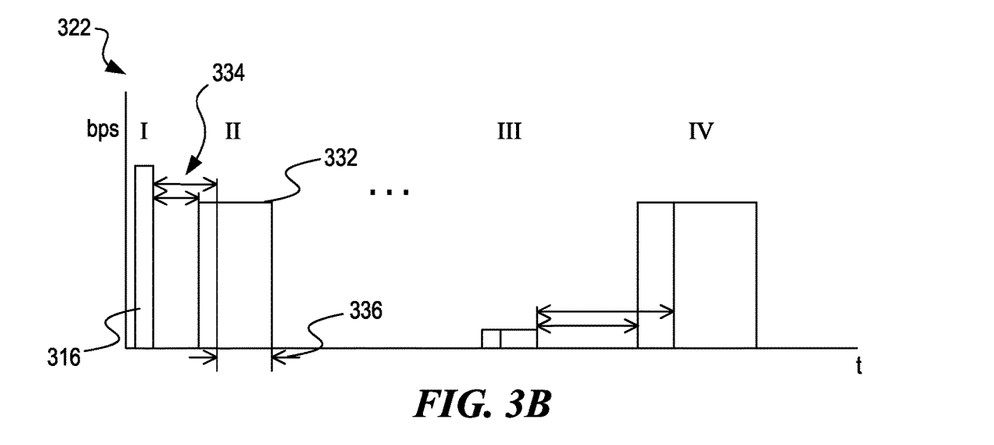
FIGS. 3B and 3C illustrate example communication templates in accordance with one or more embodiments of the technology introduced here.
Figure 3C:
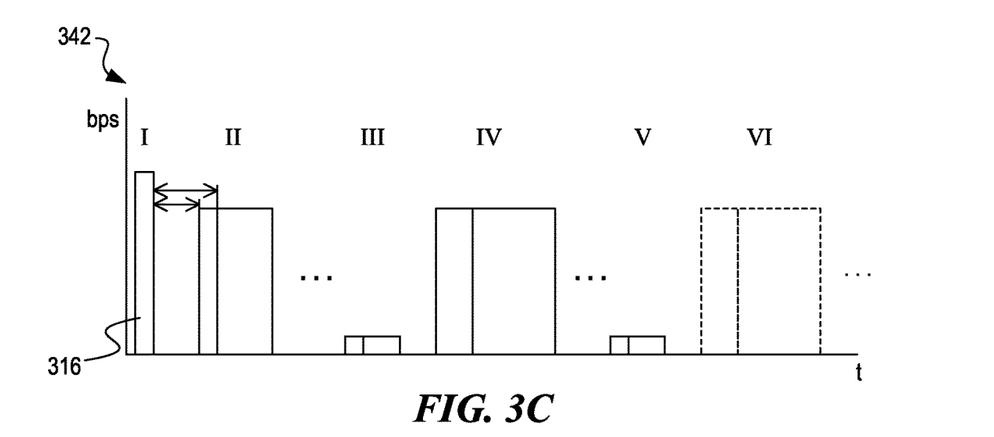

FIGS. 3B and 3C illustrate example communication templates in accordance with one or more embodiments of the technology introduced here. FIG. 3B illustrates a first example template 322 and FIG. 3C illustrates a second example template 342. The example templates can include one or more template levels 332, one or more delay thresholds 334, and/or one or more template duration thresholds 336. The templates can include predetermined threshold/ranges of levels, delays between actions/phases, and/or durations that characterize predetermined or known communication patterns. As illustrated in FIG. 3B, the first template 322 can represent a phase I that corresponds to an initial handshake stage, a phase II that corresponds to an initial download of website and/or setup information, and a phase III that corresponds to a selection and/or a preview. The phases I-III can characterize real-time, streaming, and/or speed-testing applications that precede phase IV when the real-time or streaming content and/or the actual test routine occurs.

The second template 342 can represent an access pattern that includes repeated high-bandwidth requirements. For example, the second template 342 may correspond to typical usage/consumption patterns of buffered content sites (e.g., user uploaded websites/applications). The core network 101 can use the second template 342 to predict additional data communications, such as when the user/consumer downloads or consumes additional/subsequent content. Accordingly, the core network 101 can generate the CA trigger 126 to increase throughput when the data pattern 302 satisfies the second template 342 up to and/or including phase VI. In comparison to the first template 322, the core network 101 can implement a lesser level or a lesser number of channels when the data pattern 302 satisfies the second template 342.

For illustrative purposes, the templates have been shown with example levels, durations, and patterns. However, it is understood that the templates can be different and/or customized to the corresponding communication party.

Figure 4:
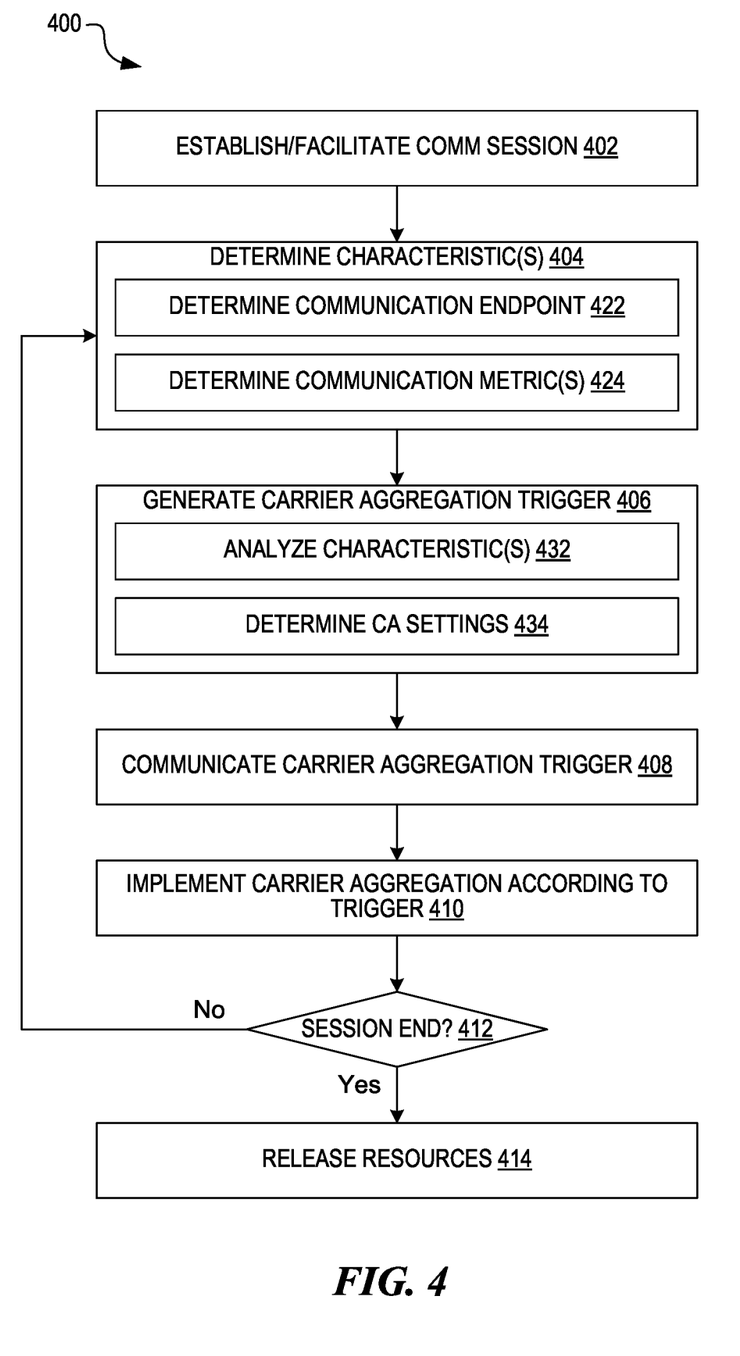
FIG. 4 is a flow diagram illustrating an example method for controlling carrier aggregation in accordance with one or more embodiments of the technology introduced here.

FIG. 4 is a flow diagram illustrating an example method 400 for controlling carrier aggregation in accordance with one or more embodiments of the technology introduced here. The method 400 can be for operating the core network 101 of FIG. 1 and/or one or more components therein (e.g., the PGW 116 of FIG. 1, the SGW 114 of FIG. 1, the MME 112 of FIG. 1, and/or the connection node 102 of FIG. 1). The method 400 can be for controlling and implementing the CA in communicating the session data 122 of FIG. 1 between the UE 104 of FIG. 1 and the connection node 102.

At block 402, the core network 101 can establish and facilitate a data communication session (e.g., the communication session 103 of FIG. 1) for exchanging data between the UE 104 and a corresponding communication endpoint (e.g., a different UE, a server, etc.). When the user operates the UE 104 (e.g., initiating an application or a connection), the core network 101 can establish the communication session 103 according to one or more applicable protocols. For example, the connection node 102 can connect to and exchange the session data 122 with the UE 104 according to one or more wireless communication protocols. Also, the core network 101 can communicate/route the session data 122 between the serving connection node 102 and the corresponding communication endpoint according to a telephony protocol and/or an internet protocol.

At block 404, the core network 101 can determine one or more characteristics descriptive of data anticipated to be communicated from or to the communication node 126. At block 422, the core network 101 (e.g., the PGW 116 and/or the SGW 114) can determine the communication endpoint of the corresponding session 103. The core network 101 can determine one or more identifiers representative of the communication endpoint, such as based on extracting one or more IP addresses included in or associated with the session data 122. Also, at block 424, the core network 101 (e.g., the PGW 116 and/or the SGW 114) can determine one or more metrics for the session data 122. The core network 101 can observe, measure, and/or calculate metrics associated with exchanged data. For example, the PGW 116 and/or the SGW 114 can measure/calculate instantaneous bit rates for the data communicated during the communication session 103. Accordingly, the core network 101 can determine/track the data pattern 302 of FIG. 3A for the communication session 103. As described below, the resulting metrics can predict or characterize the data anticipated for subsequent/upcoming data exchange(s) for the communication session 103.

At block 406, the core network 101 can generate the CA trigger 126 of FIG. 1 based on the determined communication characteristics. In generating the CA trigger 126, the core network 101 (e.g., the PGW 116 and/or the SGW 114) can analyze the determined communication characteristics as illustrated at block 432. For example, the core network 101 can include a predetermined list that maps known identifiers/addresses to CA settings. The core network 101 can analyze the determined communication characteristics based on comparing the identifier of the communication endpoint to such a predetermined list to determine a match. The endpoint identifiers can effectively represent a limited set of patterns associated with characteristic data communications to/from the communication endpoint.

Also, the core network 101 can identify one or more triggering events 316 of FIG. 3A based on timing, levels, and/or communicated directions for the data pattern 302 and/or the endpoint identifier. Using the triggering events 316 and/or the endpoint identifier, the core network 101 can compare the data pattern 302 to the threshold level 312 of FIG. 3A and/or the threshold duration 314 of FIG. 3A. Further, the core network 101 can compare the data pattern 302 to communication templates (e.g., the first template 322 of FIG. 3B, the second template 342 of FIG. 3C, and/or other predetermined templates) and/or the corresponding thresholds. The core network 101 can compare the data pattern to the templates in real-time.

At block 434, the core network 101 can determine CA settings (e.g., number of channels, channel assignments, and/or corresponding CA priorities) associated with the analysis results. The thresholds and/or templates can include the CA settings that correspond to the characterized and/or the likely subsequent communications. In other words, the core network 101 can estimate the nature/type for the current and/or upcoming communications through the analysis. The core network 101 can identify the predetermined CA settings that correspond to the estimated nature/type for the current and/or upcoming communications. The core network 101 can generate the CA trigger 126 to include/identify the determined CA settings.

As an illustrative example, the communication templates for predetermined applications and/or servers can represent/characterize a download of one or more introductory pages and/or other set up information. Accordingly, the communication templates can predict/anticipate likely subsequent high-bandwidth communications for downloading content data. The core network 101 can determine the CA settings to include the number of channels, CA configuration, and/or carrier channel assignment corresponding to the high-bandwidth communications. For example, the core network 101 can assign a maximum number of channels and/or settings (e.g., channel assignments and/or configurations) corresponding to maximum throughput for real-time video streaming content, and/or speed tests. Also, the core network 101 can assign less than the maximum number of channels and/or intermediate settings for buffered/stored contents. The core network 101 can generate the CA trigger 126 according to the determined settings for the on-going and/or likely upcoming data exchanges.

At block 408, the core network 101 can communicate the CA trigger 126. The core network 101 can communicate the CA trigger 126 to the connection node 102 (e.g., a base station) through the PGW 116, the SGW 114, and/or the MME 112. At block 410, the core network 101 can implement the CA based on the CA trigger 126. The connection node 102 can implement the CA and simultaneously transmit the session data 122 using two or more carrier channels. Accordingly, the core network 101 can control a number or an assignment of the carrier channels used by the connection node 102 to simultaneously communicate the data to be communicated from or to the connection node 102. Alternatively, or additionally, the connection node 102 can manage the channel assignments for multiple sessions according to the CA priorities specified via the CA trigger 126.

At decision block 412, the core network 101 can determine whether the communication session has ended. During the communication session, the flow can proceed to block 404 and the core network 101 can redetermine the communication characteristics. Accordingly, the core network 101 can continuously implement and/or adjust the CA settings during the communication session. When the session ends, the core network 101 can release resources (e.g., the channels) used to facilitate the ended session. The core network 101 can use the released resources for other sessions.

The CA trigger 126 generated according to the communication endpoint identifier and/or the data pattern 302 of the session data 122 provides increased efficiency and throughput for the core network 101. In comparison to the CA controlled at the base stations according to instantaneous metrics that do not account for any context, the core network 101 can control the CA using additional contextual data associated with the communication session. Accordingly, the core network 101 can identify sessions associated with high-bandwidth applications and implement the CA at the right timing and/or accurately allocate more channels for applications that require more bandwidth. Thus, the core network 101 can increase the throughput for the necessary applications while appropriately balancing the resource allocations.

Figure 5:
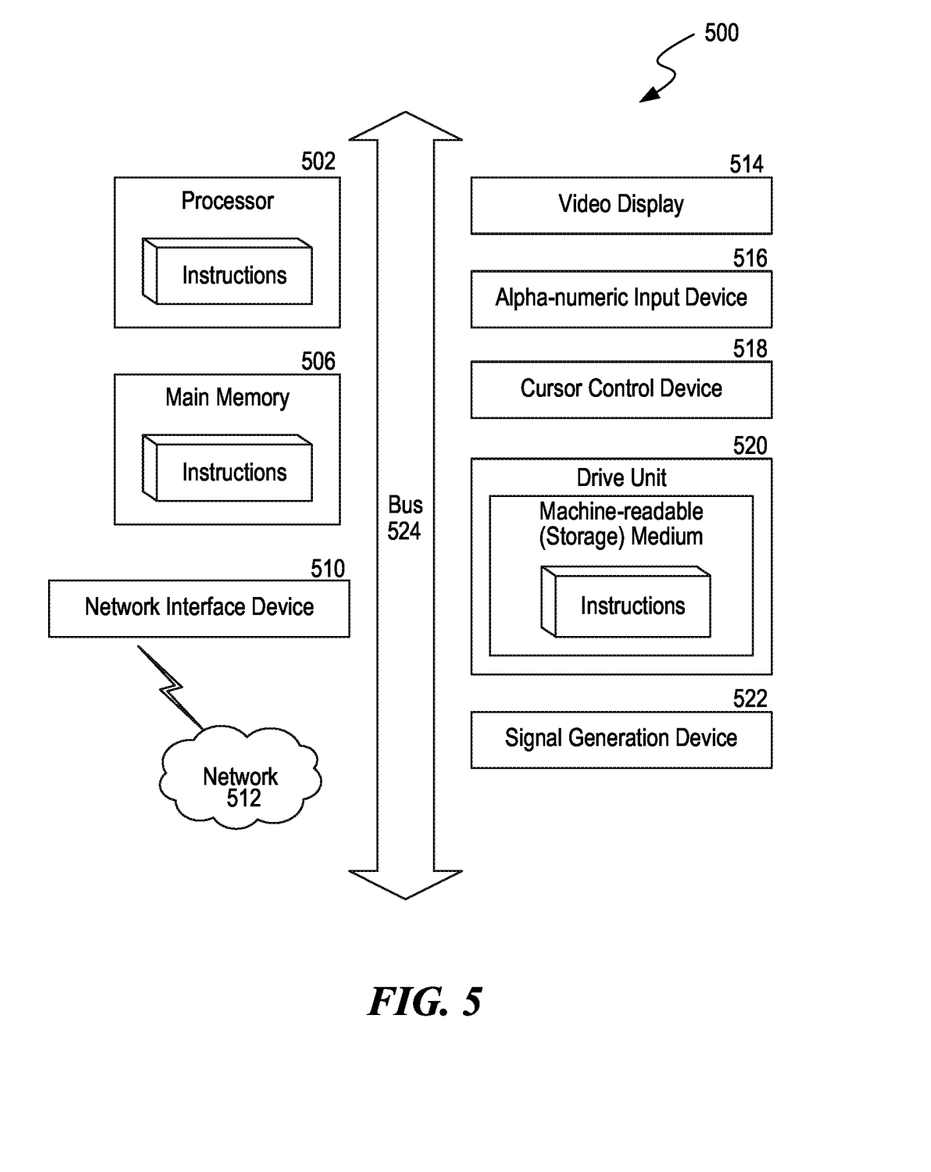
FIG. 5 is a diagrammatic representation of a machine in the example form of a computer system within which a set of instructions, for causing the machine to perform any one or more of the methodologies discussed herein, can be executed.

FIG. 5 is a diagrammatic representation of a machine in the example form of a computer system or machine 500 within which a set of instructions, when executed, can cause the machine to perform any one or more of the processes (e.g., method 400) described above. In some embodiments, the machine 500 operates as a standalone device, while in other embodiments, the machine 500 can be connected (e.g., networked) to other machines. In a networked deployment, the machine 500 may operate in the capacity of a server or a client user machine in a client-server network environment, or as a peer machine in a peer-to-peer (or distributed) network environment. The machine may include a user device, such as UEs 104 discussed above, the gNB, and/or other network components (e.g., cloud computing devices and/or servers). In some implementations, the machine 500 includes 5G servers. While a single machine is illustrated, the machine 500 can include any collection of machines that individually or jointly execute instructions to perform any of the methods described above.

The machine 500 may include a processor 502, a main memory 506 and a bus 524. The bus 524 can include a subsystem for transferring data between the components of the machine 500, including transferring data between the main memory 506 and the processor 502. The bus 524 can represent one or more separate physical buses, point to point connections, or both, connected by appropriate bridges, adapters, or controllers. The machine 500 can also include a display device 514, one or more input devices 516, a cursor control device 518 (for example, a mouse), a drive unit 520, a signal generation device or output device 522 (for example, a speaker, a remote control, etc.) and a network interface device 510, among others.

The processor(s) 502 can control the overall operation of the machine 500. The processor(s) 502 can execute computer programs or firmware stored in memory (for example, 506, 520). The processor(s) 502 can include one or more programmable general-purpose or special-purpose microprocessors, digital signal processors ("DSPs"), programmable controllers, application-specific integrated circuits ("ASICs"), programmable logic devices ("PLDs"), trusted platform modules ("TPMs"), or the like, or a combination thereof.

The main memory 506 represents any form of random access memory ("RAM"), read-only memory ("ROM"), flash memory, or the like, or a combination of such devices connected to the bus 524. The drive unit 520 can include a machine-readable medium or machine-readable storage medium that stores, encodes, or carries one or more sets of instructions for execution by the machine 500 to perform any or all of the methods described above. It should be noted that the term "machine-readable medium" and "machine-readable storage medium" can include a single medium or multiple media (for example, a centralized or distributed database, and/or associated caches and servers) that store the one or more sets of instructions embodying any or all of the methods described above.

In general, the routines executed to implement the embodiments of the disclosure can be implemented as part of an operating system or a specific application, component, program, object, module, or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 510 allows the machine 500 to mediate data in various networks with one or more entities that are external to the machine, through any known and/or convenient communications standards and protocols supported by the machine 500 and the external entities. Example protocols supported by the machine 500 include, but are not limited to: IP protocols for the application layer, transport layer protocols, Internet layer protocols, link layer protocols, LTE protocols, 3G/4G/5G protocols, etc. The network interface device 510 can include one or more of a network adaptor card, a wireless network interface card, a router, an access point, a wireless router, a switch, a multi-layer switch, a protocol converter, a gateway, a bridge, a bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that can supersede the current state of the art.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternatives or subcombinations. Each of these processes, message/data flows, or blocks may be implemented in a variety of different ways. Also, while processes or blocks are at times shown as being performed in series, these processes or blocks may instead be performed in parallel or may be performed at different times. Further, any specific numbers noted herein are only examples: alternative implementations may employ differing values or ranges.

The teachings of the methods and system provided herein can be applied to other systems, not necessarily the system described above. The elements, blocks and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. A system for use in a telecommunications network, the system comprising:
   at least one hardware processor;
   at least one hardware memory operably coupled to the at least one processor and storing computer executable instructions that, when executed by the at least one hardware processor, causes the at least one hardware processor to:
      generate a carrier aggregation change signal based on a communication characteristic,
         wherein the communication characteristic is a characteristic of data wirelessly communicated between a user equipment (UE) and a communication endpoint through a communication node,
         wherein the communication characteristic comprises a metric that is calculated from data communicated wirelessly between the UE and the communication endpoint during a time period,
         wherein the carrier aggregation change signal is configured to increase a number of component carriers for simultaneously communicating the data from or to the communication node, and
         wherein the number of component carriers is based on the communication characteristic.

2. The system of claim 1, wherein generating the carrier aggregation change signal includes generating the carrier aggregation change signal associated with a communication endpoint identifier, and wherein the communication endpoint identifier represents a limited set of patterns associated with characteristic data communications from the communication endpoint.

3. The system of claim 1, wherein the communication characteristic is determined at a service gateway (SGW) or a packet data network gateway (PGW).

4. The system of claim 1, wherein the carrier aggregation change signal is generated by a service gateway (SGW) or a packet data network gateway (PGW), and wherein the metric includes instantaneous bit rate for the data communicated by the PGW or the communication endpoint.

5. The system of claim 1, wherein the carrier aggregation change signal is generated by a service gateway (SGW) or a packet data network gateway (PGW), and wherein the instructions further comprise communicating the carrier aggregation change signal to the communication node through a mobile management entity (MME).

6. The system of claim 1, wherein the carrier aggregation change signal is generated by a service gateway (SGW) or a packet data network gateway (PGW).

7. The system of claim 1, wherein:
generating the carrier aggregation change signal comprises comparing the metric during the time period to communication templates representative of data communication patterns for multiple, different applications, and
wherein generating the carrier aggregation change signal includes comparing the metric during the time period to the communication templates representative of data communication patterns for (1) downloading one or more introductory pages and (2) downloading content data selected through the one or more introductory pages for the multiple, different applications.

8. The system of claim 1, wherein:
generating the carrier aggregation change signal comprises comparing the metric during the time period to communication templates representative of data communication patterns for multiple, different applications.

9. The system of claim 1, wherein the communication node is a base station, and wherein the system further comprises implementing carrier aggregation at the base station according to the carrier aggregation change signal, wherein implementing the carrier aggregation includes simultaneously transmitting data with two or more component carriers to the UE.

10. At least one computer-readable medium, excluding transitory signals, and carrying instructions, which when executed by at least one data processing device, execute a method of operating a telecommunication network, the method comprising:
generating a carrier aggregation change signal based on a communication characteristic,
wherein the communication characteristic comprises a metric that is calculated from data communicated wirelessly between a user equipment (UE) and a communication endpoint through a communication node during a time period,
wherein the communication characteristic includes (1) an identifier representative of the communication endpoint, (2) the metric for the data communicated during the time period, or (3) both the identifier representative of the communication endpoint and the metric for the data communicated during the time period,
wherein the carrier aggregation change signal is configured to increase a number of component carriers for simultaneously communicating the data from or to the communication node, and
wherein the number of the component carriers is based on the communication characteristic.

11. The computer-readable medium of claim 10, wherein:
generating the carrier aggregation change signal comprises comparing the metric during the time period to communication templates representative of data communication patterns for multiple, different applications.

12. The computer-readable medium of claim 10, wherein generating the carrier aggregation change signal includes generating the carrier aggregation change signal associated with the communication endpoint identifier, and wherein the communication endpoint identifier represents a limited set of patterns associated with characteristic data communications from the communication endpoint.

13. The computer-readable medium of claim 10, wherein the communication characteristic represents a characteristic of data anticipated to be communicated from or to the communication node.

14. The computer-readable medium of claim 10, wherein the communication characteristic is determined at a service gateway (SGW) or a packet data network gateway (PGW).

15. The computer-readable medium of claim 10, wherein the carrier aggregation change signal is generated by a service gateway (SGW) or a packet data network gateway (PGW).

16. The computer-readable medium of claim 10, wherein:
the communication node is a base station; and
further comprising:
implementing carrier aggregation at the base station according to the carrier aggregation change signal, wherein implementing the carrier aggregation includes simultaneously transmitting data with two or more component carriers to the U E.

17. A non-transitory, computer-readable medium comprising instructions recorded thereon, wherein the instructions, when executed by at least one processor of a system of a telecommunication network, cause the system to:
generate a carrier aggregation change signal based on a communication characteristic,
wherein the communication characteristic includes: (1) an identifier representative of a communication endpoint, (2) a metric for communicated data from or to the communication endpoint via a communication node, or (3) both the identifier representative of the communication endpoint and the metric for the communicated data,
wherein the carrier aggregation change signal is configured to increase a number of component carriers for simultaneous communication of the data to be communicated from or to the communication node,
wherein the carrier aggregation change signal is associated with the communication endpoint identifier, and
wherein the communication endpoint identifier represents a limited set of patterns associated with characteristic data communications from the communication endpoint.

18. The computer-readable medium of claim 17, further comprising instructions to:
determine the communication characteristic based on:
observing data received from the communication endpoint over a time period, and
calculating the metric for the communicated data during the time period; and
generate the carrier aggregation change signal based on comparing the metric during the time period to communication templates representative of data communication patterns for multiple, different applications.

19. The computer-readable medium of claim 17, wherein:
the communication characteristic is determined at a service gateway (SGW) or a packet data network gateway (PGW); and
the carrier aggregation change signal is generated by the SGW or the PGW.

20. The computer-readable medium of claim 17, wherein the communication node is a base station, and wherein the instructions further comprise operations to implement carrier aggregation at the base station according to the carrier aggregation change signal, wherein implementing carrier aggregation includes simultaneously transmitting data with two or more component carriers.

* * * * *